United States Patent
Cichosz et al.

(10) Patent No.: US 10,936,606 B2
(45) Date of Patent: *Mar. 2, 2021

(54) METHOD AND SYSTEM FOR PROCESSING DATA IN A PARALLEL DATABASE ENVIRONMENT

(71) Applicant: INTERNATIONAL BUSINESS MACHINES CORPORATION, Armonk, NY (US)

(72) Inventors: Pawel Cichosz, Warsaw (PL); Mieczyslaw Klopotek, Nowy Dwor Mazowiecki (PL); Krzysztof Skowronski, Brwinow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/901,168

(22) Filed: Feb. 21, 2018

(65) Prior Publication Data
US 2018/0181627 A1 Jun. 28, 2018

Related U.S. Application Data

(63) Continuation of application No. 14/337,658, filed on Jul. 22, 2014, now Pat. No. 9,953,067.

(30) Foreign Application Priority Data

Jul. 25, 2013 (GB) ..................... 1313274

(51) Int. Cl.
*G06F 16/00* (2019.01)
*G06F 16/2458* (2019.01)
*G06F 16/2453* (2019.01)

(52) U.S. Cl.
CPC ...... *G06F 16/2471* (2019.01); *G06F 16/2453* (2019.01)

(58) Field of Classification Search
CPC .................. G06F 16/2453; G06F 16/2471
(Continued)

(56) References Cited

U.S. PATENT DOCUMENTS 6,081,801 A    6/2000  Cochrane et al.
6,775,682 B1   8/2004  Ballamkonda et al.
(Continued)

OTHER PUBLICATIONS

List of IBM Patents or Patent Applications Treated as Related; (Appendix P), Filed Feb. 21, 2018; 2 pages.
(Continued)

*Primary Examiner* — Vincent F Boccio
(74) *Attorney, Agent, or Firm* — Cantor Colburn LLP; Richard Wilhelm

(57) ABSTRACT

An exemplary computer implemented method for processing data in a database management system implemented on a network of two or more nodes is disclosed. The method includes receiving a query referencing first and second user-defined table functions and a table distributed across the two or more nodes. The first user-defined table function is executed on each of the two or more nodes by processing records of the table residing on the respective nodes. A data sample is generated per node as a result of executing the first user-defined table function on each of the two or more nodes. The generated data samples are stored in a selected set of nodes. The second user-defined table function is executed on each of the selected set of nodes by processing records of the data samples residing on the respective nodes of the selected set of nodes to compute a user-defined aggregate.

20 Claims, 4 Drawing Sheets

(58) Field of Classification Search
USPC .......................................................... 707/770
See application file for complete search history.

(56) References Cited

U.S. PATENT DOCUMENTS

| | | | |
|---|---|---|---|
| 8,781,919 B2 | 7/2014 | Danesi et al. | |
| 8,856,151 B2 | 10/2014 | George | |
| 8,943,103 B2 | 1/2015 | Annapragada | |
| 9,020,929 B2 | 4/2015 | Santosuosso | |
| 9,594,803 B2 | 3/2017 | Welton et al. | |
| 9,953,067 B2* | 4/2018 | Cichosz | G06F 16/2453 |
| 2007/0038658 A1 | 2/2007 | Ghosh | |
| 2009/0164412 A1 | 6/2009 | Bestgen et al. | |
| 2009/0234799 A1 | 9/2009 | Betawadkar-Norwood et al. | |
| 2010/0169302 A1* | 7/2010 | Lopes | G06F 12/0804 |
| | | | 707/713 |
| 2011/0040773 A1 | 2/2011 | Danesi et al. | |
| 2011/0047172 A1 | 2/2011 | Chen et al. | |
| 2012/0191699 A1* | 7/2012 | George | G06F 16/24554 |
| | | | 707/718 |
| 2014/0114952 A1 | 4/2014 | Robinson et al. | |
| 2015/0032774 A1 | 1/2015 | Cichosz et al. | |

OTHER PUBLICATIONS

Friedman et al. "SQL/MapReduce: a practical approach to self-describing, polymorphic, and parallelizable user-defined functions." Proc. VLDB Endow. 2, 2 (Aug. 2009), 1402-1413.

Jaedicke et al., "A Framework for Parallel Processing of Aggregate and Scalar Functions in Object-Relational DBMS" Institute of informatik; Sep. 1997; 25 pgs.

Search Report for GB Patent Application No. GB1313274.1 filed Jul. 25, 2014, dated Jan. 16, 2014, 3 pgs.

* cited by examiner

US 10,936,606 B2

METHOD AND SYSTEM FOR PROCESSING DATA IN A PARALLEL DATABASE ENVIRONMENT

PRIORITY

This application is a continuation of and claims priority to U.S. patent application Ser. No. 14/337,658, filed Jul. 22, 2014, which in turn claims priority to Great Britain Patent Application No. 1313274.1, filed Jul. 25, 2013, titled "METHOD AND SYSTEM FOR PROCESSING DATA IN PARALLEL DATABASE ENVIRONMENT." The entire contents of both applications listed above are incorporated herein by reference.

BACKGROUND

The invention relates to computing systems and, more particularly, to a method for processing data in a parallel database environment.

A parallel, shared-nothing database environment is characterized by the usage of a large number of parallel storage-and-processing units, called nodes, equipped with a processor and easy-to-access sets of records. However, accessing data from nodes is performed in a kind of bulk exchange of sets of records between the nodes.

SUMMARY

One embodiment is a computer implemented method for processing data in a database management system implemented on a network of two or more nodes, where each of the two or more nodes includes a processor, a storage device, and a memory. The method includes receiving a query referencing a first user-defined table function, a second user-defined table functions, and a table distributed across the two or more nodes. The first user-defined table function is executed on each of the two or more nodes by processing records of the table residing on the respective nodes. A data sample is generated per node as a result of executing the first user-defined table function on each of the two or more nodes. The generated data samples are stored in a selected set of nodes. The second user-defined table function is executed on each of the selected set of nodes by processing records of the data samples residing on the respective nodes of the selected set of nodes to compute a user-defined aggregate.

Another embodiment is a system for processing data in a database management system implemented on a network of two or more nodes, where each of the two or more nodes includes a processor, a storage device, and a memory. The two or more processors of the two or more nodes are configured to receive a query referencing a first user-defined table function, a second user-defined table functions, and a table distributed across the two or more nodes. The processors are further configured to execute the first user-defined table function on each of the two or more nodes by processing records of the table residing on the respective nodes. The processors are configured to generate a data sample per node as a result of executing the first user-defined table function on each of the two or more nodes. The processors are configured to store the generated data samples in a selected set of nodes. The processors are configured to execute the second user-defined table function on each of the selected set of nodes by processing records of the data samples residing on the respective nodes of the selected set of nodes to compute a user-defined aggregate.

Yet another embodiment is a computer program product for processing data in a database management system implemented on a network of two or more nodes, where each of the two or more nodes includes a processor, a storage device, and a memory. The computer program product includes a computer readable storage medium having program instructions embodied therewith. The program instructions are executable by a processor to cause the processor to perform a method. The method includes receiving a query referencing a first user-defined table function, a second user-defined table functions, and a table distributed across the two or more nodes. The first user-defined table function is executed on each of the two or more nodes by processing records of the table residing on the respective nodes. A data sample is generated per node as a result of executing the first user-defined table function on each of the two or more nodes. The generated data samples are stored in a selected set of nodes. The second user-defined table function is executed on each of the selected set of nodes by processing records of the data samples residing on the respective nodes of the selected set of nodes to compute a user-defined aggregate.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

In the following, some embodiments of the invention will be described in greater detail by way of example only, making reference to the drawings in which.

DETAILED DESCRIPTION

Figure 1:
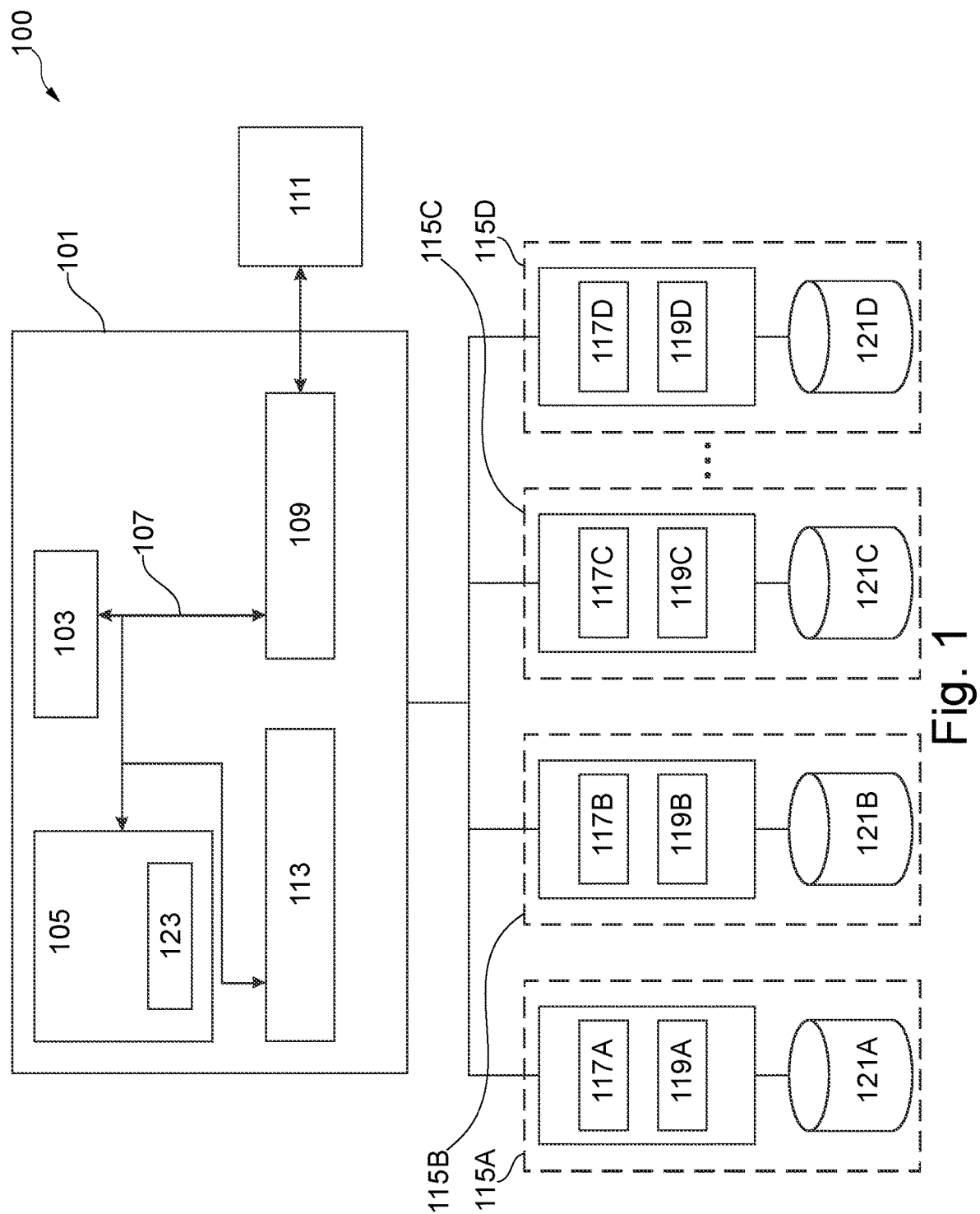
FIG. 1 illustrates system architecture operable to execute a method for processing data, according to some embodiments.

In the following, like numbered elements in the figures either designate similar elements or designate elements that perform an equivalent function. Elements which have been discussed previously will not necessarily be discussed in later figures if the function is equivalent.

In one aspect, some embodiments of this disclosure relate to a computer implemented method for processing data on a database management system implemented on a network of multiple nodes, each of the multiple nodes comprising at least one of a processor, storage device, and memory. The method comprises: receiving a query referencing first and second user-defined table functions and a table distributed on the multiple nodes; executing the first user-defined table function on each of the multiple nodes by processing records of the table residing on the respective nodes for generating a data sample per node; storing the generated data samples in a selected set of nodes; and executing the second user-defined table function on each of the selected set of nodes by processing records of the data samples residing on the respective nodes of the selected set of nodes to compute a user-defined aggregate.

The database management system may be a relational or multidimensional database management system, or a combination thereof.

The term "user-defined table function" (UDTF) as used herein refers to a function that is provided by a user for directly accessing database tables and returning a table that includes zero or more rows, each row having one or more columns.

The network of nodes may include other nodes than the multiple nodes, and the set of nodes may or may not comprise a node of the multiple nodes. The set of nodes may be selected based on their performance characteristics. The performance characteristic may comprise an input/output (I/O) response time and/or I/O throughput. For example, the set of nodes may be the nodes with the lowest I/O response time.

These features may be advantageous as they may allow controlled processing of data on a plurality of nodes, e.g., in a shared-nothing environment, using predefined structures of the UDTFs and specific combinations of two UDTFs with system resources. This is in contrast to the conventional usage of the UDTFs, which is based on a prefixed system structure on which individual UDTFs may be executed.

The fact of executing the two UDTFs on a row-wise basis and on different nodes may lead to an optimal usage of resources of the system, so as to increase its performance. And applying at a first stage the first user-defined table function may diminish the amount of data to be transferred and, thus, may reduce the data traffic.

Providing the resulting data samples as well as the user-defined aggregates as vectors or tables may reduce their execution burden compared to single values.

The present methods may be implemented without hardware and software overhead in some embodiments and, thus, may be seamlessly integrated in existing systems.

According to one embodiment, the processing of the records of the table includes, for a given node: initializing an intermediate data structure to store a data sample on the given node, processing each record of the records of the table residing on the given node for generating a data subsample, combining the generated data subsamples for generating the data sample of the given node, and storing said data sample in the intermediate data structure.

The intermediate data structure may be a two-dimensional array or table. The initialization of the intermediate data structure may include a selection of the size of the table.

The operations of this embodiment may be executed locally on the given node in parallel to their execution on the other nodes of the multiple nodes.

The generation of the intermediate structure may be used for further processing, as described in the following embodiment.

According to one embodiment, the processing of the records of the data sample includes, for a given selected node, initializing a result data structure to store a data aggregate on the given selected node, processing each record of the records of the intermediate data structure on the given selected node for computing the user-defined aggregate, and storing the computed user-defined aggregate in the result data structure.

For example, the user-defined aggregate may be computed in each of the selected set of nodes, resulting in a set of intermediate user-defined aggregates, which may then be combined to form a final user-defined aggregate.

In case the intermediate data structures are stored in a single selected node, a final user-defined aggregate may be directly computed on the selected node and a combination need not be required.

According to one embodiment, the method further comprises receiving a selection of a plurality of fields of the table, splitting the table into a plurality of sub-tables using the selected fields, the sub-tables being distributed on the multiple nodes, wherein the execution of the first user-defined table function comprises sequentially processing records of each of the plurality of sub-tables residing on the respective nodes for generating a plurality of data subsamples per node.

This may provide a parallel group-by capability for the two UDTFs.

For example, the plurality of fields may include a field having grouping attribute values for each record, where the grouping attribute may be used to split the table.

According to one embodiment, the records of each sub-table of the plurality of sub-tables are sequentially arranged, where the sequential processing includes, for a given node: initializing a first data structure on the given node; reading a record and determining whether said record is a first record in the sequence of records of a first sub-table of the plurality of sub-tables stored in the node; storing said record; in case the record is not a first record, processing a previous record stored in a previous processing step of the sequential processing; determining a second sub-table of the plurality of sub-tables to which said record belongs; and if the determined second sub-table is different from the first sub-table to which the previous record belongs, storing the generated data subsample from the first sub-table to which the previous record belongs in the first data structure, and otherwise repeating the above operations.

This may be advantageous as it may provide a simplified method for generating outputs from corresponding tables. Thus, it may avoid usage of records from different tables to produce an output from a single table.

According to one embodiment, the method further includes: initializing a second data structure in the given node; reading a record and determining whether said record is a first record in the sequence of records of the second sub-table, storing said record; in case the record is not a first record, processing a previous record stored in a previous processing of the sequential processing; determining a third sub-table of the plurality of sub-tables to which said record belongs; and if the determined third sub-table is different from the second sub-table to which the previous record belongs, storing the generated data subsample from the second sub-table in the second data structure, and otherwise repeating the above operations.

According to one embodiment, the execution of the second user-defined table function includes sequentially processing records of a plurality of data structures stored in the selected set of nodes, where the execution of the second user-defined table function on a selected node includes: reading a record and determining whether said record is a first record of a data structure of the plurality of data structures stored in the selected node; storing said record; in case the record is not a first record, processing a previous record stored in a previous processing step of the sequential processing; determining another data structure to which said record belongs; and if the determined another data structure is different than the data structure to which the previous record belongs, outputting the computed user-defined aggregate from the first data structure to which the previous record belongs.

According to one embodiment, the first user-defined table function is concurrently executed on each of the multiple nodes.

According to one embodiment, the second user-defined table function is concurrently executed on each the selected set of nodes.

These embodiments may be advantageous as they may speed up the process of generating the user-defined aggregate.

According to one embodiment, the query references the set of nodes. This may further speed up said process as it may avoid selecting the set of nodes during the execution of the process.

According to one embodiment, the set of nodes is a single node.

This may avoid the step of combining multiple user-defined aggregates that would be otherwise required with more than one node.

According to one embodiment, the first and second user-defined table functions are included in a single user-defined table function.

In another aspect, the invention relates to a computer program product comprising computer executable instructions to perform the method operations of any one of the preceding embodiments.

In another aspect, the invention relates to a computer system in a database management system implemented on a network of multiple nodes, each of the multiple nodes comprising at least one of a processor, storage device, and memory, the computer system being configured to perform the above method operations.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

FIG. 1 depicts exemplary system architecture 100 for processing data. The system architecture 100 may be a shared-nothing architecture. The system architecture 100 provides a computer system 101. The components of computer system 101 may include, but are not limited to, one or more processors or processing units 103, a system memory 105, and a bus 107 that couples various system components including system memory 105 to processor 103. Computer system 101 further comprises a query input terminal 109 that allows a user to enter queries into the system 100.

Computer system 101 typically includes a variety of computer system readable media. Such media may be any available media that is accessible by computer system 101, and it includes both volatile and non-volatile media, removable and non-removable media.

System memory 105 may include computer system readable media in the form of volatile memory, such as random access memory (RAM) and/or cache memory.

Computer system 101 may also communicate with one or more external devices such as a keyboard, a pointing device, a display 111, etc.; one or more devices that enable a user to interact with computer system 101; and/or any devices (e.g., network card, modem, etc.) that enable computer system 101 to communicate with one or more other computing devices. Such communication can occur via I/O interface(s). Still yet, computer system 101 can communicate with one or more networks such as a local area network (LAN), a general wide area network (WAN), and/or a public network (e.g., the Internet) via network adapter 113. As depicted, network adapter 113 communicates with the other components of computer system 101 via bus 107.

The computer system 101 is connected to one or more nodes 115A-115D storing relational database in one or more data storage devices 121A-121D. The nodes 115A-115D may be included in a parallel network and coordinated by a network protocol. Each node of the nodes 115A-115D has its own CPU 117A-D, in operative combination with its memory 119A-119D and storage device 121A-121D respectively. Each of nodes 115A-115D may operate like an independent system running its own operating environment.

The data contained in the base tables in the storage devices 121A-121D is retrievable by means of a query to the database computer system 101. The query contains at least one query element that requires local computation or local coordination of data computation performed across the nodes 115A-115D.

The computer system 101 and nodes 115 may be implemented in separate machines, or may be implemented as separate processes in a single machine.

The computer system 101 may act as a query coordinator for generating multi-dimensional data from tables stored in a relational database in the storage devices 121A-121D.

When processing a query, each node works on the rows in a table that it has locally, and may, for example, pass the node's partial result back to the computer system 101. The partial results may be moved to other nodes for further processing, and all the results from the nodes may be combined into a final result set.

The system memory 105 may comprise an operating system as well as other application programs including, for example, a query engine 123 for performing queries on databases.

Figure 2:
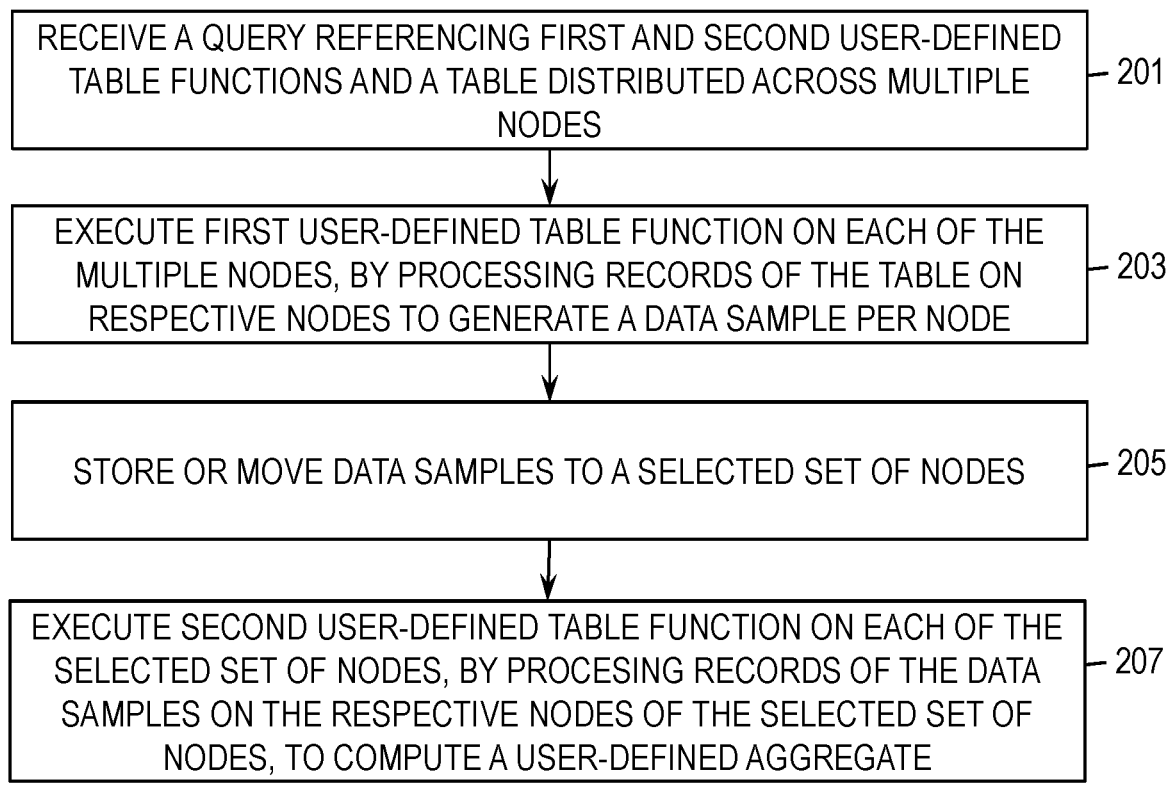
FIG. 2 shows a flowchart of a method for processing data, according to some embodiments.

FIG. 2 is a flowchart of a method for processing data on the computer system 100.

In block 201, the computer system 101 receives a query via, for example, the query terminal 109. The query references a first and second user-defined table function and a table distributed on the multiple nodes. For example, the query may be a SQL query, having the following structure:
Select*from
(select 1 as distkey,*
from
(select datasliceid+0 as distkeyint,*
from <atable>),
UDTF1( . . . )),
UDTF2( . . . )

In this simplified example, the query is indicative of the first and second user-defined table functions, UDTF1 and UDTF2, which may be defined by a user. The UDTF1 may be executed at a first stage. The UDTF2 may be executed at a second stage to compute the final result using outputs produced after execution of the UDTF1.

The inner part (i.e., select 1 as distkey, u1.*from <aTable>,UDTF1( . . . )u1) indicates the table, aTable, on which the UDTF1 may be executed in parallel on each node to generate, for example, one record at each node. The output field here, 1 as distkey, ensures that all the generated records are thereafter transferred to a single node having associated number 1. Then Select*from . . . , UDTF2( . . . ) causes UDTF2 to produce the final aggregate.

In block 203, the first user-defined table function is executed on each of the multiple nodes by processing records of the table residing on the respective nodes for generating a data sample per node. For example, the first user-defined table function may be concurrently executed on each of the nodes where the table is stored.

In block 205, the generated data samples are stored or moved to a selected set of nodes. For example, the selected set of nodes may be a single node.

In block 207, the second user-defined table function is executed on each of the selected set of nodes by processing records of the data samples residing on the respective nodes of the selected set of nodes to compute a user-defined aggregate.

For example, the UDTF2 may be concurrently run on each of the selected nodes and may combine computed aggregates in each of the set of the nodes to provide the user-defined aggregate. The user-defined aggregate may be a vector of result values.

A simplified example may be a data table with vectors (e.g., tf-idf vectors describing a text document, feature vectors of images, vector descriptions of products, etc.). In this case, the user-defined aggregate may be the centroid of all vectors.

To provide such aggregates, a first UDTF may compute sufficient statistics (or intermediate data samples) in terms of the vector of sums of each vector component and the number of records. This may happen on each node. The resulting sufficient statistics records are sent to a given node, where a second UDTF computes the sums of components of all vectors of sums and the sum of the record counts, and then divides each sum of components by the sum of record counts to provide the user-defined aggregates.

Figure 3:
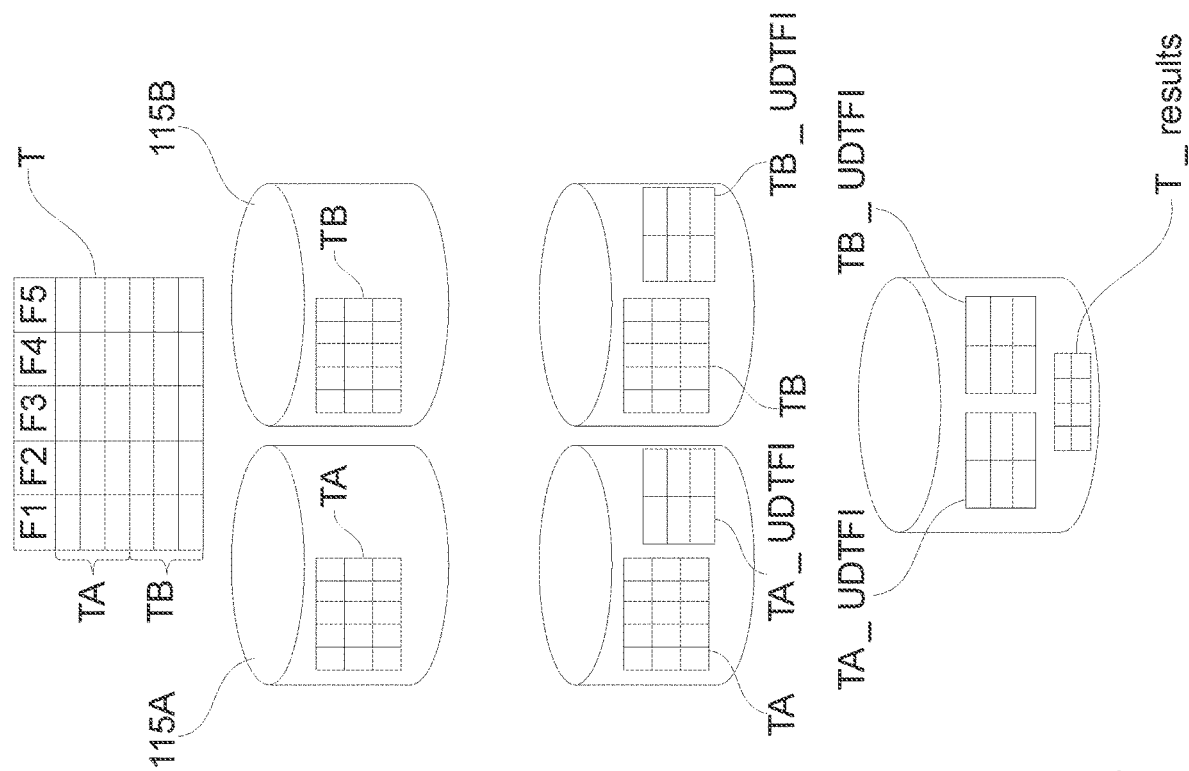
FIG. 3 shows a flowchart of a further exemplary method for processing a table, according to some embodiments.
Figure 3:
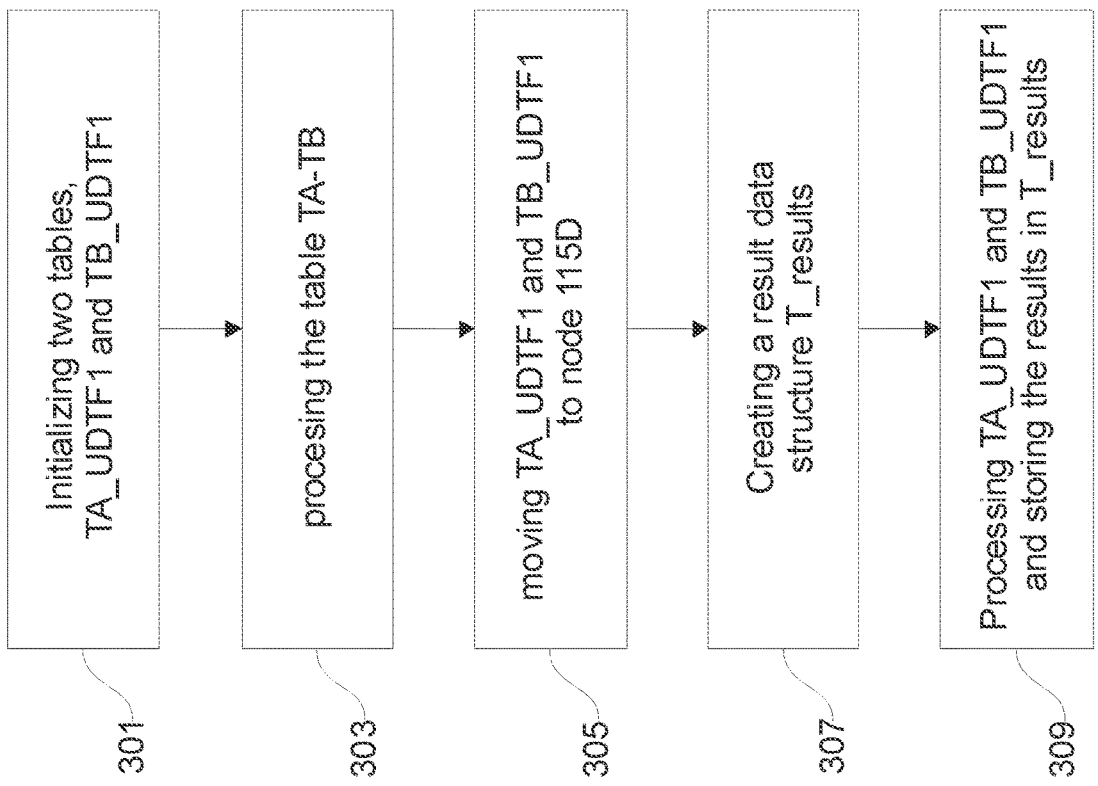

FIG. 3 shows a flowchart of a method for processing a table T, which lists information within each cell of the table T. The table T provides, for example, fields F1-F5, and records. For simplicity of the description, the table T is shown as containing five fields F1-F5 and 6 records or rows only, but it may contain more or fewer fields and records. The table T may be distributed across the one or more nodes 115A-115D by copying, for example, table portions TA-TB to the nodes 115A-115B respectively. In another example, the table T may be split differently into other partitions.

The table T may be indicated in a query that may be received by the computer system 101. For example, the table T may be used as input to the first user-defined table function UDTF1 to compute intermediate data that may be further processed by the second user defined table function UDTF2 to compute the final result for the user-defined aggregate.

For that, in block 301, two tables TA_UDTF1 and TB_UDTF1, corresponding to the number of portion tables TA and TB, may be initialized so as to contain the results of the processing of the table portions TA and TB respectively. For example, the tables TA_UDTF1 and TB_UDTF1 are created and initialized to zero in the nodes 115A and 115B respectively. The results of processing the tables TA and TB may be stored in the tables TA_UDTF1 and TB_UDTF1 respectively. For example, each of the tables TA_UDTF1 and TB_UDTF1 may comprise at least one record.

The processing of the tables TA-TB in block 303 may be performed on a row level basis. For example, each record of the three records of the table TA residing on node 115A may be separately processed for generating three data subsamples. In an alternative example, two first records may be processed separately of the record third record. After processing the three records, the generated data subsamples may be combined to form a single data sample that may be stored in the table TA_UDTF1. The combination may be commutative and associative.

The intermediate tables TA_UDTF1 and TB_UDTF1 may be moved in block 305 to a selected node, for example the node 115D. The node 115D may be selected based on its I/O response time. For example, the node 115D has the lowest I/O response time at the time of moving the intermediate tables. In an alternative example, the tables TA_UDTF1 and TB_UDTF1 may be moved to two different nodes.

In block 307, a result data structure, T_result, may be created and initialized to store a data aggregate on the selected node 115D.

In block 309, each record of the records of the intermediate tables TA_UDTF1 and TB_UDTF1 are processed locally on the selected node 115D for computing the user-defined aggregate, which is then stored in the result table that is output to the user. For example, a user-defined aggregate may be computed from TA_UDTF1 and another user-defined aggregate may be computed from TB_UDTF1. In other terms, the user-defined aggregate may be computed separately for each group TA and TB. The user-defined aggregate may comprise for example at least one record.

Figure 4:
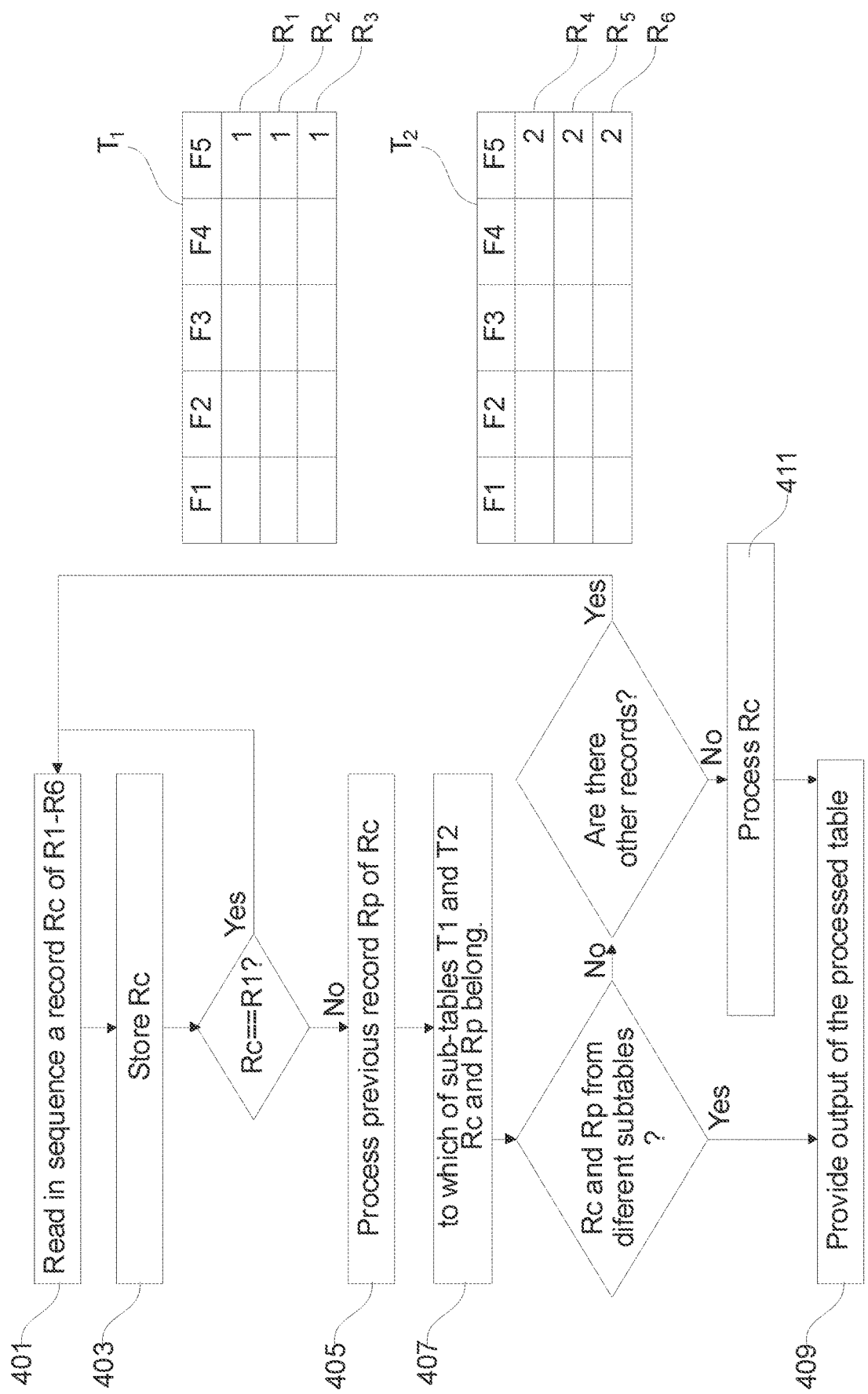
FIG. 4 shows a flowchart of a further exemplary method for processing multiple tables, according to some embodiments.

FIG. 4 shows a flowchart of a method for processing the table T, wherein the table T may be split into two sub-tables T1 and T2. This may be done, for example, using grouopingattribute in the SQL query. The field F5 of the table T may comprise grouping attribute values for each record. For example, the query may be indicative of the fields that may be used to split the table T as follows:

```
Select * from
(select 1 as distkey, *,rank( ) over (order by
<groupingattribute>) as rankedby
from
(select datasliceid+0 as distkeyint, *,rank( ) over
(partition by datasliceid order by
<groupingattribute>) as rankedby
from <atable>),
UDTF1(rankedBy, <groupingattribute>, ... .)),
UDTF2(rankedBy, <groupingattribute>, ... .)
```

Alternatively:

```
Select * from
(select <groupingattribute> as distkey, *,rank( ) over (order by
<groupingattribute>) as rankedby
from
(select datasliceid+0 as distkeyint, *,rank( ) over
(partition by datasliceid order by
<groupingattribute>) as rankedby
from <atable>),
UDTF1(rankedBy, <groupingattribute>, ... .)),
UDTF2(rankedBy, <groupingattribute> , ... .)
```

In this example, the sub-table T1 may be the part of table T where the groupingattribute takes the value 1, while the sub-table T2 consists of those records of T for which the groupingattribute has the value 2. The table T itself may be distributed over multiple nodes of the network (e.g., 115A-115D) in that the sub-tables are distributed (e.g., T1 has parts of its records on nodes 115A, 115D, and 115B, and T2 on nodes 115A, 115B, and 115C). So there may be nodes where both records of T1 and T2 are present, and others where only one of them is present. The table T may be split by the groupingattribute in many more sub-tables, or in just one table if the groupingattribute takes the same value for all the records. The processing method of the table T described above with reference to FIG. 3 may be separately applied for each of the sub-tables T1 and T2 (i.e., to their respective parts on each node). In addition, and in order to assign the right output to the right sub-table, the following method may be used.

For example, when processing sub-tables T1 and T2, the records R1-R12 may be sequentially processed. In block 401, a record R3 of the records R1-R6 may be read. The record is then stored locally in block 403. In case the read record R3 is different from the first record R1, the previous record R2 may be processed in block 405. In block 407, it is determined to which sub-table, T1 or T2, the record R3 and its previous record R2 belong. If they are different (e.g., in case the read record is R4, which is the first record of T2, and the previous one is R3, which is the last record of T1), then an output may be generated from the processed records in block 409. Said output may be correctly assigned to said sub-table. If the sub-tables to which the read record and the previous record belong are the same, blocks 401 to 407 are repeated. The processing may start with one of the two sub-tables T1 and T2. In case the processing starts with table T1 and the read record is the last record of sub-table T2, the read record is processed in block 411, and then an output is generated from the processed records of the sub-table T2.

In the following, a simplified exemplary method for processing and UDTF1 and UDTF2 is described. The processing within UDTF1 would run as follows, for example, within an IBM NETEZZA system. Sufficient statistics are initialized, in a node, from zero records. When newInputRecord( ) method is invoked, one record of sufficient statistics is computed and combined with previous computed sufficient statistics. When nextEoiOutputRow( ) method is invoked, data slice sufficient statistics are outputted.

The processing within UDTF2 would run as follows: Global sufficient statistics are initialized from zero records. When newInputRecord( ) method is invoked, one record of a set of sufficient statistics of a data slice (or node) is read and it is combined with the global one. When nextEoiOutputRow( ) method is invoked, the aggregate vector is computed out of the global sufficient statistics, and it is outputted.

The sufficient statistics may fulfill the following conditions: sufficient statistics may be derivable from a single record; two sets of sufficient statistics may be combined to provide sufficient statistics; the combination operator may be commutative and associative.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A computer-implemented method for processing data in a database management system implemented on a network of two or more nodes, each of the two or more nodes comprising a processor, a storage device, and a memory, the method comprising:
   receiving a query, wherein the query indicates a first user-defined table function, a second user-defined table function, and a table distributed across the two or more nodes, wherein the first user-defined table function and the second user-defined table function together define a user-defined aggregate function applicable to the table and configured to return a result table; and
   computing a table aggregate in a shared-nothing architecture responsive to the user-defined aggregate function, wherein the computing the table aggregate comprises:
      executing the first user-defined table function on each of the two or more nodes by processing respective records of the table residing on each node of the two or more nodes;
      generating a data sample associated with each node of the two or more nodes as a result of executing the first user-defined table function on each of the two or more nodes, wherein each data sample of the two or more nodes meets sufficiency criteria;
      wherein each data sample meeting the sufficiency criteria is derivable from a single record of the table, wherein each two data samples meeting the sufficiency criteria are combinable via a combination operator to provide an other potential data sample meeting the sufficiency criteria, and wherein the combination operator is commutative and associative;
      storing the generated data samples in a selected set of nodes; and
      executing the second user-defined table function on the selected set of nodes by, at each selected node of the selected set of nodes, processing records of the data samples residing on the selected node of the selected set of nodes to generate the table aggregate, wherein the table aggregate comprises the result table having a plurality of result values.

2. The computer-implemented method of claim 1, wherein the processing the respective records of the table residing on each node comprises, for a given node:
   initializing an intermediate data structure to store a data sample on the given node;
   processing each record of the records of the table residing on the given node for generating a data subsample;
   combining, at the given node, the generated data subsamples for generating the data sample of the given node; and
   storing the data sample in the intermediate data structure.

3. The computer-implemented method of claim 2, wherein, at each selected node of the selected set of nodes, the processing the records of the data samples residing on the selected node comprises:
   initializing a result data structure to store a data aggregate on the selected node;
   processing each record of the records of the intermediate data structure on the selected node for computing the table aggregate; and
   storing the computed table aggregate in the result data structure.

4. The computer-implemented method of claim 1, further comprising:
receiving a selection of a plurality of fields of the table; and
splitting the table into a plurality of sub-tables using the selected fields, the sub-tables being distributed on the two or more nodes;
wherein the executing the first user-defined table function on each of the two or more nodes comprises sequentially processing records of each of the plurality of sub-tables residing on the respective to generate a plurality of data subsamples per node.

5. The computer-implemented method of claim 4, wherein the records of each sub-table of the plurality of sub-tables are sequentially arranged, wherein the sequential processing comprises for a given node:
initializing a first data structure on the given node;
reading a record and determining whether said record is a first record in the sequence of records of a first sub-table of the plurality of sub-tables stored in the node;
storing said record;
in case the record is not a first record, processing a previous record stored in a previous processing of the sequential processing;
determining a second sub-table of the plurality of sub-tables to which said record belongs; and
if the determined second sub-table is different from the first sub-table to which the previous record belongs, storing the generated data subsample from the first sub-table to which the previous record belongs in the first data structure, and otherwise repeating the reading, storing, processing a previous record, and determining a second sub-table.

6. The computer-implemented method of claim 5, further comprising:
initializing a second data structure in the given node;
reading a record and determining whether said record is a first record in the sequence of records of the second sub-table;
storing said record;
in case the record is not a first record, processing a previous record stored in a previous processing of the sequential processing;
determining a third sub-table of the plurality of sub-tables to which said record belongs; and
if the determined third sub-table is different from the second sub-table to which the previous record belongs, storing the generated data subsample from the second sub-table in the second data structure, and otherwise repeating the reading, storing, processing a previous record, and determining a third sub-table.

7. The computer-implemented method of claim 5, wherein the executing the second user-defined table function comprises sequentially processing records of a plurality of data structures stored in the selected set of nodes, and wherein the executing the second user-defined table function on a first selected node of the selected set of nodes comprises:
reading a record and determining whether the record is a first record of a data structure of the plurality of data structures stored in the first selected node;
storing the record;
in case the record is not a first record, processing a previous record stored in a previous processing of the sequential processing;
determining another data structure to which the record belongs; and if the determined another data structure is different than the data structure to which the previous record belongs, outputting the computed table aggregate from the first data structure to which the previous record belongs.

8. A system for processing data in a database management system implemented on a network of two or more nodes, the system comprising:
one or more memories having computer-readable instructions; and
one or more processors for executing the computer-readable instructions, the computer-readable instructions comprising:
receiving a query, wherein the query indicates a first user-defined table function, a second user-defined table function, and a table distributed across the two or more nodes, wherein the first user-defined table function and the second user-defined table function together define a user-defined aggregate function applicable to the table and configured to return a result table; and
computing a table aggregate in a shared-nothing architecture responsive to the user-defined aggregate function, wherein the computing the table aggregate comprises:
executing the first user-defined table function on each of the two or more nodes by processing respective records of the table residing on each node of the two or more nodes;
generating a data sample associated with each node of the two or more nodes as a result of executing the first user-defined table function on each of the two or more nodes, wherein each data sample of the two or more nodes meets sufficiency criteria;
wherein each data sample meeting the sufficiency criteria is derivable from a single record of the table, wherein each two data samples meeting the sufficiency criteria are combinable via a combination operator to provide an other potential data sample meeting the sufficiency criteria, and wherein the combination operator is commutative and associative;
storing the generated data samples in a selected set of nodes; and
executing the second user-defined table function on the selected set of nodes by, at each selected node of the selected set of nodes, processing records of the data samples residing on the selected node of the selected set of nodes to generate the table aggregate, wherein the table aggregate comprises the result table having a plurality of result values.

9. The system of claim 8, wherein the processing the respective records of the table residing on each node comprises, for a given node:
initializing an intermediate data structure to store a data sample on the given node;
processing each record of the records of the table residing on the given node for generating a data subsample;
combining, at the given node, the generated data subsamples for generating the data sample of the given node; and
storing the data sample in the intermediate data structure.

10. The system of claim 9, wherein, at each selected node of the selected set of nodes, the processing the records of the data samples residing on the selected node comprises:
initializing a result data structure to store a data aggregate on the selected node;

processing each record of the records of the intermediate data structure on the selected node for computing the table aggregate; and storing the computed table aggregate in the result data structure.

11. The system of claim 8, the computer-readable instructions further comprising:

receiving a selection of a plurality of fields of the table; and splitting the table into a plurality of sub-tables using the selected fields, the sub-tables being distributed on the two or more nodes;

wherein the executing the first user-defined table function on each of the two or more nodes comprises sequentially processing records of each of the plurality of sub-tables residing on the respective to generate a plurality of data subsamples per node.

12. The system of claim 11, wherein the records of each sub-table of the plurality of sub-tables are sequentially arranged, wherein the sequential processing comprises for a given node:

initializing a first data structure on the given node;

reading a record and determining whether said record is a first record in the sequence of records of a first sub-table of the plurality of sub-tables stored in the node;

storing said record;

in case the record is not a first record, processing a previous record stored in a previous processing of the sequential processing;

determining a second sub-table of the plurality of sub-tables to which said record belongs; and if the determined second sub-table is different from the first sub-table to which the previous record belongs, storing the generated data subsample from the first sub-table to which the previous record belongs in the first data structure, and otherwise repeating the reading, storing, processing a previous record, and determining a second sub-table.

13. The system of claim 12, the computer-readable instructions further comprising:

initializing a second data structure in the given node;

reading a record and determining whether said record is a first record in the sequence of records of the second sub-table;

storing said record;

in case the record is not a first record, processing a previous record stored in a previous processing of the sequential processing;

determining a third sub-table of the plurality of sub-tables to which said record belongs; and if the determined third sub-table is different from the second sub-table to which the previous record belongs, storing the generated data subsample from the second sub-table in the second data structure, and otherwise repeating the reading, storing, processing a previous record, and determining a third sub-table.

14. The system of claim 12, wherein the executing the second user-defined table function comprises sequentially processing records of a plurality of data structures stored in the selected set of nodes, and wherein the executing the second user-defined table function on a first selected node of the selected set of nodes comprises:

reading a record and determining whether the record is a first record of a data structure of the plurality of data structures stored in the first selected node;

storing the record;

in case the record is not a first record, processing a previous record stored in a previous processing of the sequential processing;

determining another data structure to which the record belongs; and if the determined another data structure is different than the data structure to which the previous record belongs, outputting the computed table aggregate from the first data structure to which the previous record belongs.

15. A computer-program product for processing data in a database management system implemented on a network of two or more nodes, the computer-program product comprising a computer-readable storage medium having program instructions embodied therewith, the program instructions executable by one or more processors to cause the one or more processors to perform a method comprising:

receiving a query, wherein the query indicates a first user-defined table function, a second user-defined table function, and a table distributed across the two or more nodes, wherein the first user-defined table function and the second user-defined table function together define a user-defined aggregate function applicable to the table and configured to return a result table; and computing a table aggregate in a shared-nothing architecture responsive to the user-defined aggregate function, wherein the computing the table aggregate comprises:

executing the first user-defined table function on each of the two or more nodes by processing respective records of the table residing on each node of the two or more nodes;

generating a data sample associated with each node of the two or more nodes as a result of executing the first user-defined table function on each of the two or more nodes, wherein each data sample of the two or more nodes meets sufficiency criteria;

wherein each data sample meeting the sufficiency criteria is derivable from a single record of the table, wherein each two data samples meeting the sufficiency criteria are combinable via a combination operator to provide an other potential data sample meeting the sufficiency criteria, and wherein the combination operator is commutative and associative;

storing the generated data samples in a selected set of nodes; and executing the second user-defined table function on the selected set of nodes by, at each selected node of the selected set of nodes, processing records of the data samples residing on the selected node of the selected set of nodes to generate the table aggregate, wherein the table aggregate comprises the result table having a plurality of result values.

16. The computer-program product of claim 15, wherein the processing the respective records of the table residing on each node comprises, for a given node:

initializing an intermediate data structure to store a data sample on the given node;

processing each record of the records of the table residing on the given node for generating a data subsample;

combining, at the given node, the generated data subsamples for generating the data sample of the given node; and storing the data sample in the intermediate data structure.

17. The computer-program product of claim 16, wherein, at each selected node of the selected set of nodes, the processing the records of the data samples residing on the selected node comprises:
- initializing a result data structure to store a data aggregate on the selected node;
- processing each record of the records of the intermediate data structure on the selected node for computing the table aggregate; and
- storing the computed table aggregate in the result data structure.

18. The computer-program product of claim 15, the method further comprising:
- receiving a selection of a plurality of fields of the table; and
- splitting the table into a plurality of sub-tables using the selected fields, the sub-tables being distributed on the two or more nodes;
- wherein the executing the first user-defined table function on each of the two or more nodes comprises sequentially processing records of each of the plurality of sub-tables residing on the respective to generate a plurality of data subsamples per node.

19. The computer-program product of claim 18, wherein the records of each sub-table of the plurality of sub-tables are sequentially arranged, wherein the sequential processing comprises for a given node:
- initializing a first data structure on the given node;
- reading a record and determining whether said record is a first record in the sequence of records of a first sub-table of the plurality of sub-tables stored in the node;
- storing said record;
- in case the record is not the first record, processing a previous record stored in a previous processing of the sequential processing;
- determining a second sub-table of the plurality of sub-tables to which said record belongs; and
- if the determined second sub-table is different from the first sub-table to which the previous record belongs, storing the generated data subsample from the first sub-table to which the previous record belongs in the first data structure, and otherwise repeating the reading, storing, processing a previous record, and determining a second sub-table.

20. The computer-program product of claim 19, wherein the executing the second user-defined table function comprises sequentially processing records of a plurality of data structures stored in the selected set of nodes, and wherein the executing the second user-defined table function on a first selected node of the selected set of nodes comprises:
- reading a record and determining whether the record is a first record of a data structure of the plurality of data structures stored in the first selected node;
- storing the record;
- in case the record is not the first record, processing a previous record stored in a previous processing of the sequential processing;
- determining another data structure to which the record belongs; and
- if the determined another data structure is different than the data structure to which the previous record belongs, outputting the computed table aggregate from the first data structure to which the previous record belongs.

* * * * *